(12) United States Patent
Nagai

(10) Patent No.: US 8,491,006 B2
(45) Date of Patent: Jul. 23, 2013

(54) AIRBAG DEVICE

(75) Inventor: Makoto Nagai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 89 days.

(21) Appl. No.: 13/142,690

(22) PCT Filed: Dec. 28, 2009

(86) PCT No.: PCT/JP2009/071776
§ 371 (c)(1),
(2), (4) Date: Jun. 29, 2011

(87) PCT Pub. No.: WO2010/084696
PCT Pub. Date: Jul. 29, 2010

(65) Prior Publication Data
US 2011/0266781 A1 Nov. 3, 2011

(30) Foreign Application Priority Data
Jan. 22, 2009 (JP) .................................. 2009-011658

(51) Int. Cl.
*B60R 21/2338* (2011.01)
*B60R 21/2334* (2011.01)
*B60R 21/239* (2006.01)
*B60R 21/2342* (2011.01)

(52) U.S. Cl.
USPC ..................... 280/743.2; 280/739; 280/743.1

(58) Field of Classification Search
USPC ......................... 280/743.1, 743.2, 739, 728.2
See application file for complete search history.

(56) References Cited

U.S. PATENT DOCUMENTS

| 5,865,465 | A | * | 2/1999 | Bauer et al. | 280/743.1 |
| 5,899,495 | A | * | 5/1999 | Yamamoto et al. | 280/743.1 |
| 6,247,727 | B1 | * | 6/2001 | Hamada et al. | 280/743.2 |
| 2004/0164527 | A1 | | 8/2004 | Nagata et al. | |
| 2005/0062268 | A1 | | 3/2005 | Inoue et al. | |
| 2006/0192368 | A1 | * | 8/2006 | Hall et al. | 280/730.2 |
| 2007/0152435 | A1 | * | 7/2007 | Jamison et al. | 280/743.2 |
| 2009/0236836 | A1 | * | 9/2009 | Abe et al. | 280/739 |

FOREIGN PATENT DOCUMENTS

| DE | 10360509 | 7/2004 |
| EP | 1514743 | 3/2005 |
| EP | 1547875 | 6/2005 |
| GB | 2343420 | 5/2000 |

(Continued)

*Primary Examiner* — Joseph Rocca
*Assistant Examiner* — George Spisich
(74) *Attorney, Agent, or Firm* — Rankin, Hill & Clark LLP (57) ABSTRACT

An airbag device is provided in which since part of a base fabric of the airbag (16) excluding an occupant restraining face (16d) is joined by stitchings (S1 to S3) having breaking strengths that increase in going from an already deployed portion toward a not yet deployed portion, during the process of deploying the airbag by gas generated by an inflator, the stitchings (S1 to S3) of the airbag (16) break from the already deployed portion toward the not yet deployed portion, and the airbag (16) is continuously inflated from the occupant restraining face (16d) side toward the inflator side. As a result, it is possible to stabilize the shape of the airbag (16) during the process of deployment and to inflate the occupant restraining face (16d) of the airbag (16) at an early stage, thus ensuring occupant restraining performance. Further, since the airbag (16) is provided with a vent hole (16e) on a base (16c) side, maintaining the vent hole (16e) in a closed state until the airbag (16) is completely deployed enables the airbag (16) to be quickly deployed, and opening the vent hole (16e) after deployment of the airbag (16) is completed can prevent the internal pressure from increasing excessively.

16 Claims, 9 Drawing Sheets

FOREIGN PATENT DOCUMENTS

| | | |
|---|---|---|
| JP | 7-069149 | 3/1995 |
| JP | 7-205750 | 8/1995 |
| JP | 8-156730 | 6/1996 |
| JP | 9-142238 | 6/1997 |
| JP | 9-156451 | 6/1997 |
| JP | 2005-153726 | 6/2005 |
| JP | 2005-206069 | 8/2005 |
| WO | 99/42332 | 8/1999 |

\* cited by examiner

AIRBAG DEVICE

TECHNICAL FIELD

The present invention relates to an airbag device in which an airbag housed in a folded state is deployed by gas generated by an inflator.

BACKGROUND ART

An airbag device for a passenger seat in which a panel of an airbag that opposes a window when deployed is pleated and restrained by a strap, and when the airbag is deployed into an intermediate shape, the strap breaks and the airbag is deployed into a final shape is known from Patent Document 1 below.

Furthermore, an airbag device for a passenger seat in which part of an airbag that becomes a lower part on an occupant side when deployed is folded in two and stitched by control stitching, and when the internal pressure of the airbag increases to a predetermined value during the process of deployment the stitching part breaks and the airbag is deployed into a final shape is known from Patent Document 2 below.

Patent Document 1: Japanese Patent Application Laid-open No. 7-69149
Patent Document 2: Japanese Patent Application Laid-open No. 9-142238

DISCLOSURE OF INVENTION

Problems to be Solved by the Invention

In the above-mentioned conventional arrangements, since the portion of the airbag that is pleated and restrained by the strap or the portion that is folded in two and stitched by the control stitching deploys at once by breakage of the strap or the control stitching, it is difficult to finely control the deployed shape of the airbag.

The present invention has been accomplished in light of the above-mentioned circumstances, and it is an object thereof to carry out precise control of the shape of an airbag during the process of deployment.

Means for Solving the Problems

In order attain the above object, according to a first aspect of the present invention, there is provided an airbag device in which an airbag housed in a folded state is deployed by gas generated by an inflator, characterized in that part of a base fabric of the airbag excluding an occupant restraining face is joined by joining parts having different breaking strengths along a deployment direction of the airbag, and the breaking strength of the joining parts increases in going from an already deployed portion of the airbag toward a not yet deployed portion.

Further, according to a second aspect of the present invention, in addition to the first aspect, a portion joined by the joining parts of the airbag is folded in a bellows shape so as to be able to extend in the deployment direction.

Furthermore, according to a third aspect of the present invention, in addition to the first aspect, a portion joined by the joining parts of the airbag is folded in a roll shape so as to be able to extend in the deployment direction.

Moreover, according to a fourth aspect of the present invention, in addition to any one of the first to third aspects, the airbag comprises a vent hole closed by the joining parts.

Effects of the Invention

In accordance with the first aspect of the present invention, since part of the base fabric of the airbag excluding the occupant restraining face is joined by the joining parts having breaking strengths that increase in going from the already deployed portion toward the not yet deployed portion, during the process of deploying the airbag by gas generated by the inflator, the joining parts of the airbag break from the already deployed portion toward the not yet deployed portion, and the airbag is continuously inflated from the occupant restraining face side toward the inflator side. As a result, it is possible to stabilize the shape of the airbag during the process of deployment and to inflate the occupant restraining face of the airbag at an early stage, thus ensuring occupant restraining performance.

Furthermore, in accordance with the second aspect of the present invention, since the portion joined by the joining parts is folded in a bellows shape so that the airbag can extend in the deployment direction, it is possible to continuously inflate the airbag from the occupant restraining face side toward the inflator side accompanying breakage of the joining parts.

Moreover, in accordance with the third aspect of the present invention, since the portion joined by the joining parts is folded in a roll form so that the airbag can extend in the deployment direction, it is possible to continuously inflate the airbag from the occupant restraining face side toward the inflator side accompanying breakage of the joining parts.

Furthermore, in accordance with the fourth aspect of the present invention, since the airbag is provided with the vent hole that is closed by the joining parts, maintaining the vent hole in a closed state until the airbag is completely deployed enables the airbag to be quickly deployed, and opening the vent hole after deployment of the airbag is completed can prevent the internal pressure from increasing excessively.

EXPLANATION OF REFERENCE NUMERALS AND SYMBOLS

16 Airbag
16d Occupant restraining face
16e Vent hole
25 Inflator
S1 First stitching (joining part)

S2 Second stitching (joining part)
S3 Third stitching (joining part)

BEST MODE FOR CARRYING OUT THE
INVENTION

Modes for carrying out the present invention are explained below by reference to the attached drawings.

First Embodiment

FIG. 1 to FIG. 5 show a first embodiment of the present invention.

Figure 1:
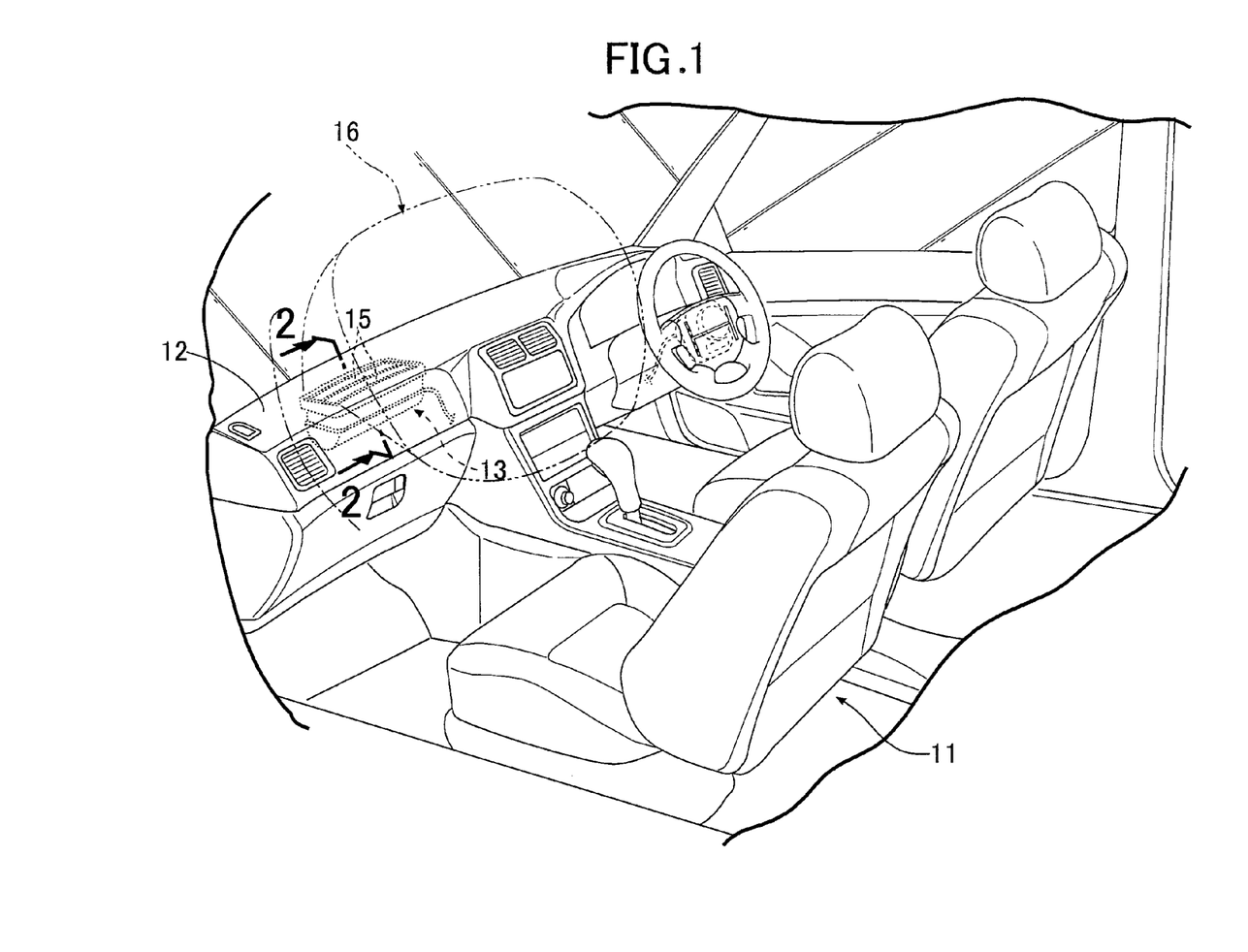
FIG. 1 is a perspective view of a vehicle compartment front part of an automobile related to a first embodiment (first embodiment).

As shown in FIG. 1, an airbag device 13 is provided in an instrument panel 12 positioned in front of a passenger seat 11 of an automobile. The airbag device 13 includes two lids 15 and 15 that open and close a rectangular opening 14 (see FIG. 5) formed in the instrument panel 12, and these lids 15 and 15 are formed integrally with the instrument panel 12.

Figure 2:
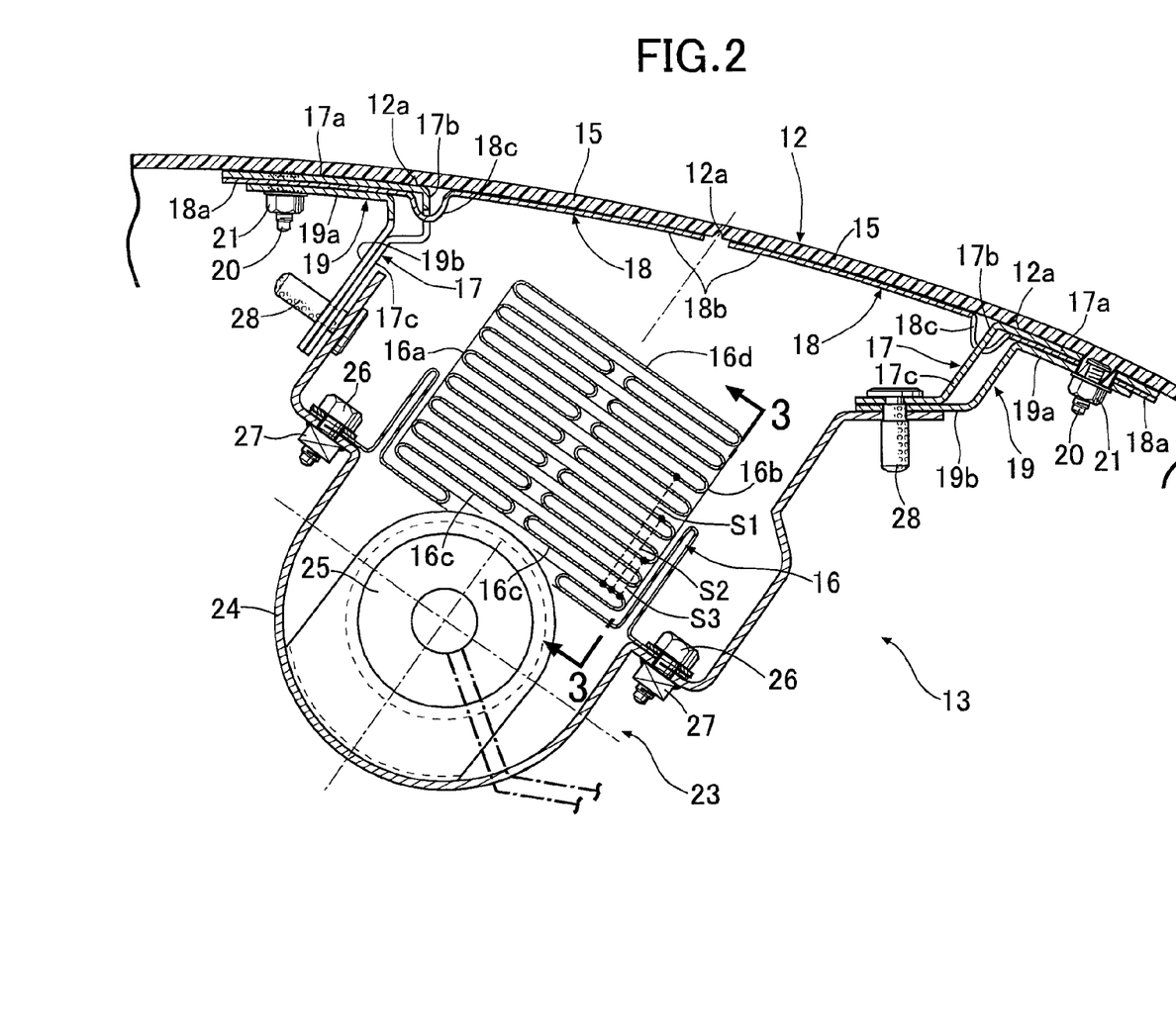
FIG. 2 is an enlarged sectional view along line 2-2 in FIG. 1 (first embodiment).

As shown in FIG. 2, a thin breaking portion 12a defining outer edges of the lids 15 and 15 is formed on a lower face of the instrument panel 12, and the opening 14 is formed as a result of the breaking portion 12a being broken during deployment of the airbag 16 and the lids 15 and 15 opening. A reinforcing plate 17 made of metal and formed in a rectangular frame shape is fixed to the lower face of the instrument panel 12 surrounding the opening 14. A pair of front and rear band-shaped bent portions 17b and 17b are formed integrally with the inner periphery of a fixing portion 17a of the reinforcing plate 17 fixed to the instrument panel 12, and these bent portions 17b and 17b extend downwardly to the inside of the instrument panel 12 so as to follow the front edge and rear edge of the opening 14. A plurality of L-shaped extension portions 17c extend downwardly from the lower end of each bent portion 17b.

The front edge of the lid 15 on the front side and the rear edge of the lid 15 on the rear side are supported on the instrument panel 12 at the front and rear of the opening 14 respectively via hinge plates 18 and 18 made of metal so that they can open and close freely. Each hinge plate 18 includes a fixing portion 18a superimposed on a lower face of the fixing portion 17a of the reinforcing plate 17, a movable portion 18b fixed to a lower face of the lid 15 by means of hot swaging, etc., and a plurality of hinge portions 18c connecting the fixing portion 18a and the movable portion 18b. Each hinge portion 18c is formed with a U-shaped cross section and extends toward the interior of the instrument panel 12. The bent portion 17b of the reinforcing plate 17 is fitted into the interior of the hinge portion 18c of the hinge plate 18, and the extension portions 17c of the reinforcing plate 17 pass between adjacent hinge portions 18c of the hinge plate 18 and extend downward.

A fixing portion 19a of a mounting bracket 19 made of metal is superimposed on and fixed to a lower face of the fixing portion 18a of each hinge plate 18. A plurality of L-shaped module support portions 19b extend downwardly from the fixing portion 19a of the mounting bracket 19.

The fixing portion 17a of the reinforcing plate 17 superimposed on the lower face of the instrument panel 12, the fixing portion 18a of the hinge plate 18, and the fixing portion 19a of the mounting bracket 19 are tightened together by means of bolts 20 and nuts 21.

An airbag module 23 includes a container-shaped retainer 24 having an open upper face, an cylindrical inflator 25 supported in a bottom part of the retainer 24, and the airbag 16 fixed to the retainer 24 by means of bolts 26 and nuts 27 in a folded state. An open part at the upper end of the retainer 24 is tightened to the extension portions 17c of the reinforcing plate 17 and the module support portion 19b of the mounting bracket 19 by means of clips 28.

Figure 3:
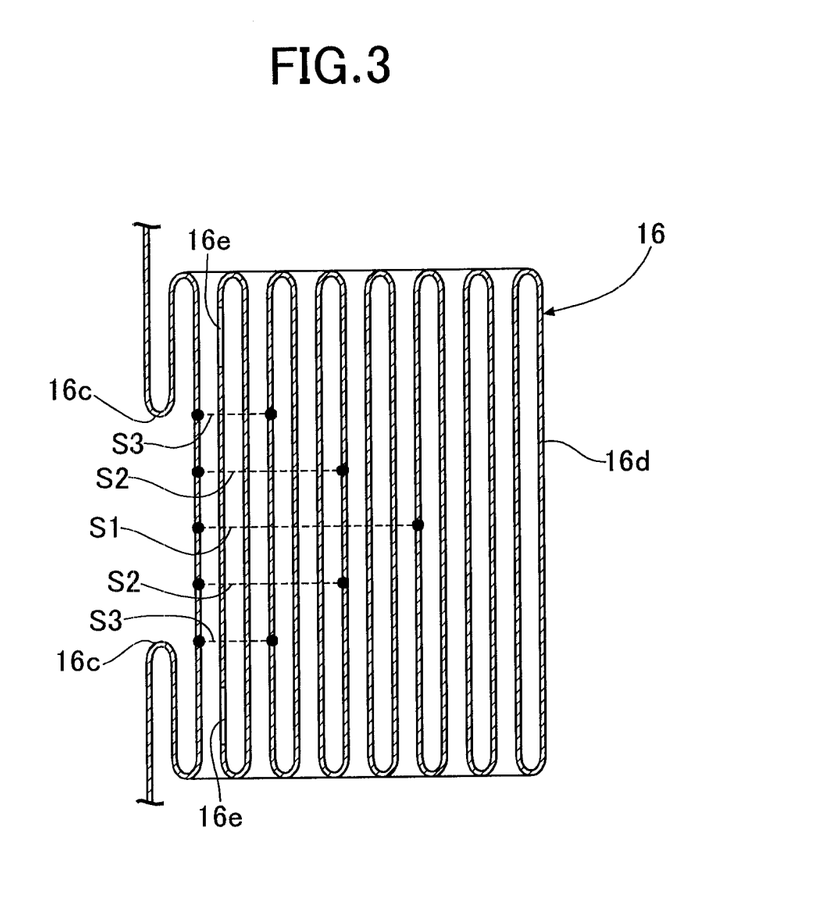
FIG. 3 is a view from arrowed line 3-3 in FIG. 2 (first embodiment).

As shown in FIG. 2 and FIG. 3, the airbag 16 is housed in the interior of the retainer 24 in a bellows-shaped folded state. Of an upper wall face 16a and a lower wall face 16b of a base fabric forming the airbag 16, a portion close to a base 16c of the lower wall face 16b on the inflator 25 side is stitched by stitchings S1 to S3 along a plurality of lines extending in the deployment direction (vehicle body fore-and-aft direction) toward an occupant restraining face 16d side opposing the occupant. The first stitching S1, which is in the middle in the vehicle width direction, extends the longest from the base 16c of the airbag 16 toward the occupant restraining face 16d that is to oppose the occupant, the two second stitchings S2 and S2, which are on opposite left and right sides of the first stitching S1, are shorter than the first stitching S1, and the two third stitchings S3 and S3, which are on opposite left and right sides of the second stitchings S2 and S2, are shorter than the second stitchings S2 and S2.

That is, among the extremities of the first to third stitchings S1 to S3 on the occupant restraining face 16d side, the extremity of the first stitching S1 is the closest to the occupant restraining face 16d, and the extremities of the third stitchings S3 and S3 are the furthest from the occupant restraining face 16d. The total breaking strength of the first to third stitchings S1 to S3 is the highest on the base 16c side and the lowest on the occupant restraining face 16d side.

Vent holes 16e and 16e are formed in a lower part of left and right side faces in the vicinity of the base 16c of the airbag 16. When the airbag 16 is nondeployed, the vent holes 16e and 16e are closed by the first to third stitchings S1 to S3.

The operation of the first embodiment having the above-mentioned arrangement is now explained.

Figure 5:
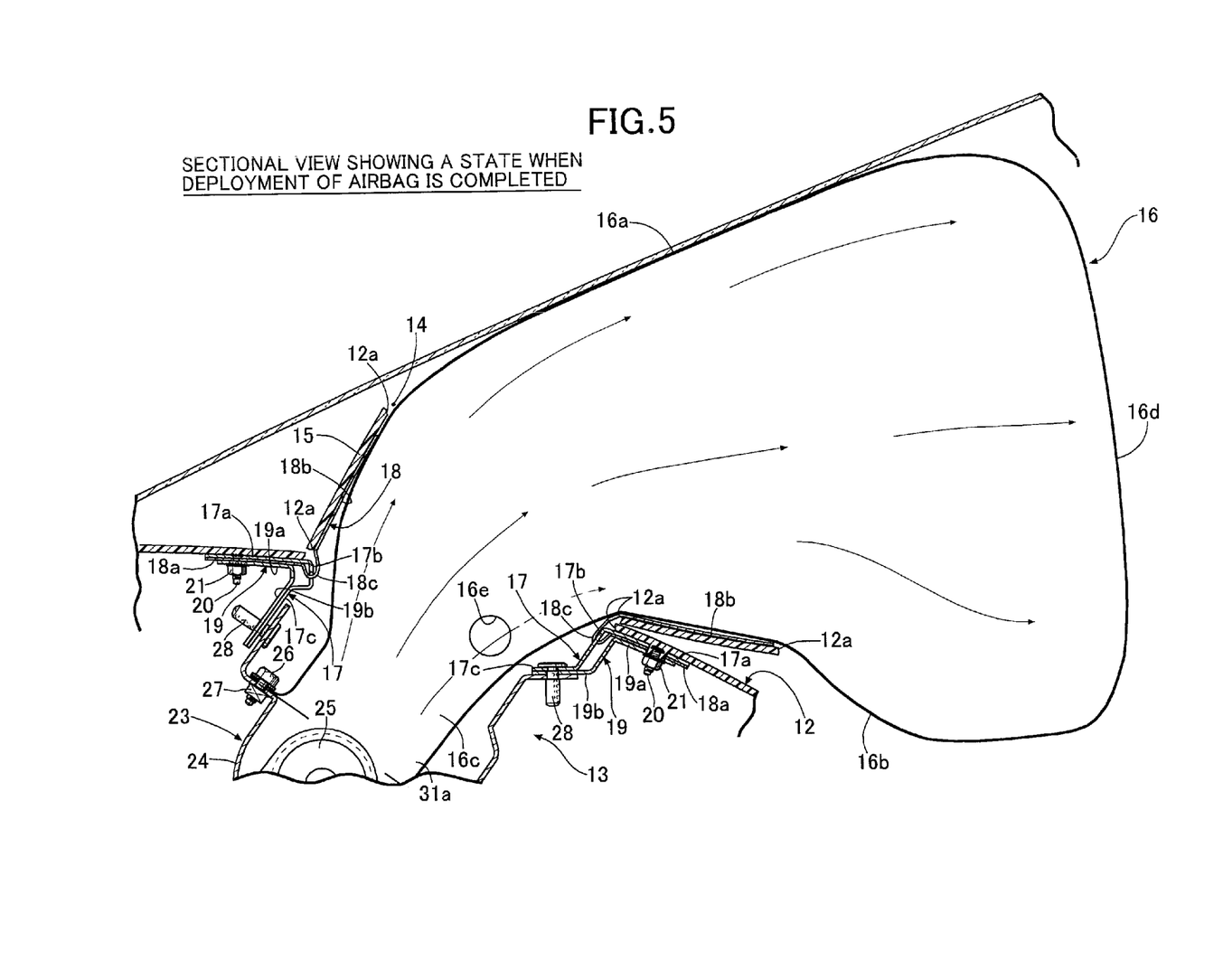
FIG. 5 is a sectional view showing a state when deployment of the airbag is completed (first embodiment).

When the vehicle is involved in a collision and a deceleration of a predetermined value or greater is detected, the inflator 25 of the airbag module 23 generates high pressure gas, and the airbag 16 in a folded state is inflated by the gas. As shown in FIG. 2 and FIG. 5, when the airbag 16 is inflated in the interior of the retainer 24, the pressure acts on the lower faces of the lids 15 and 15 of the instrument panel 12, the breaking portion 12a of the instrument panel 12 surrounding the lids 15 and 15 breaks so as to open the lids 15 and 15, and the airbag 16 is deployed into the interior of the compartment via the opening 14 formed in the instrument panel 12.

When the pair of front and rear lids 15 and 15 are opened, they pivot upward with as a fulcrum the hinge portions 18c of the hinge plates 18 and 18 provided on the lower faces thereof, and since the hinge portions 18c are formed in a U-shape they bend easily, thus enabling the lids 15 and 15 to be opened smoothly.

Figure 4:
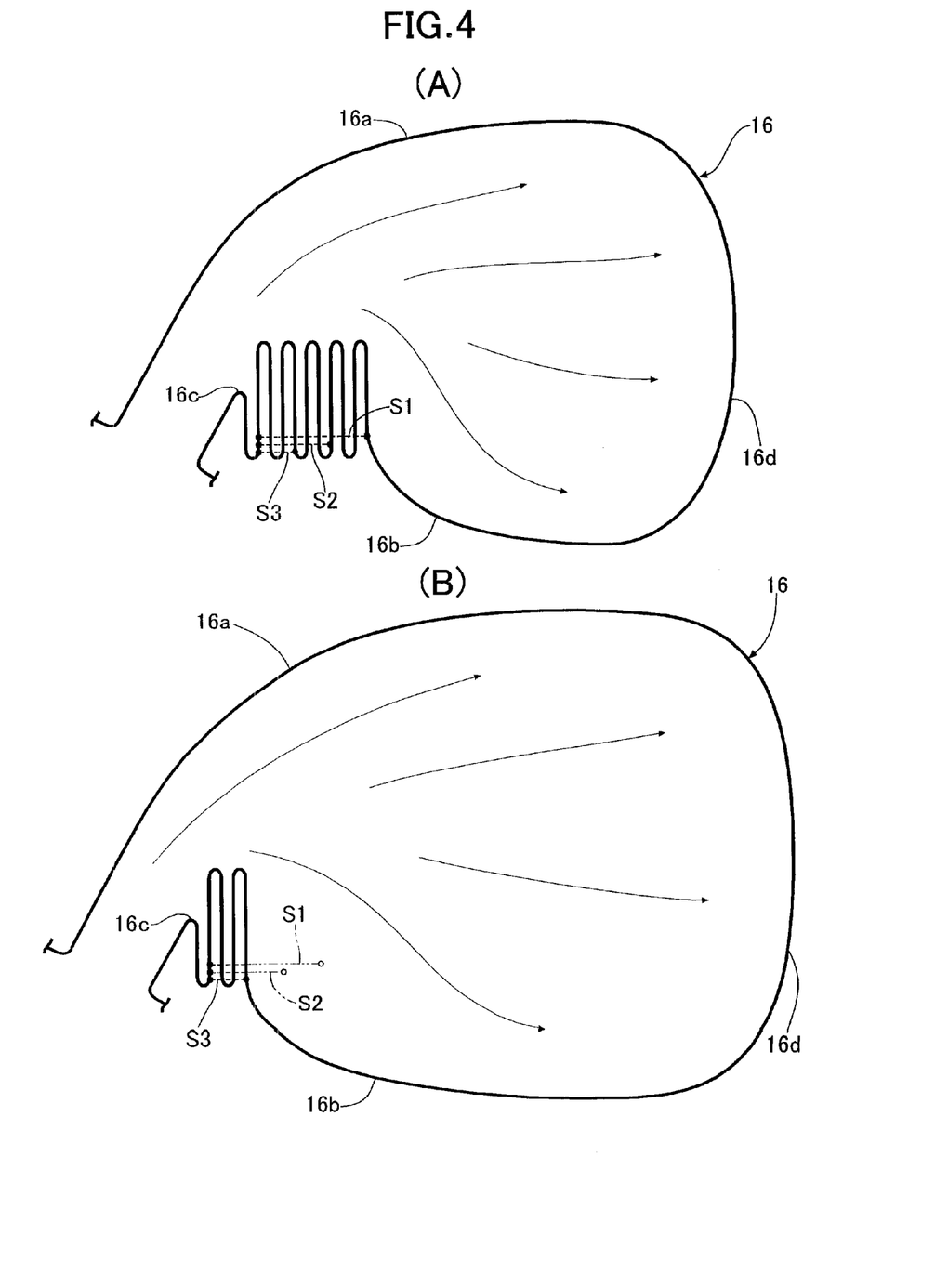
FIG. 4 is a diagram for explaining the process of deployment of an airbag (first embodiment).

When gas generated by the inflator 25 is supplied to the interior of the folded airbag 16, as shown in FIG. 4 (A), the superimposition of the upper wall face 16a of the airbag 16, the occupant restraining face 16d, and part of the lower wall face 16b on the occupant restraining face 16d side, that is, portions for which deployment is not restricted by the first to third stitchings S1 to S3, is released, and they are deployed into the compartment. When the internal pressure of the airbag 16 increases to a predetermined value or greater, among the first to third stitchings S1 to S3 of the airbag 16, breaking starts from an end part, on the occupant restraining face 16d side, of the first stitching S1 in the middle. The reason therefor is that among the first to third stitchings S1 to S3 the load is concentrated on the end part of the first stitching S1, which is the only place projecting toward the occupant restraining face 16d side.

As a result, the portion of the lower wall face 16b of the airbag 16 on the base end 16c side, for which deployment is restricted by the first to third stitchings S1 to S3, undergoes deployment from the occupant restraining face 16d side, and when breaking of the first stitching S1 reaches the vicinity of end parts of the second stitchings S2 and S2 on the occupant restraining face 16d side, breaking of the second stitchings S2 and S2 starts from the end parts on the occupant restraining face 16d side, and as shown in FIG. 4 (B), a deployed portion of the airbag 16 enlarges from the occupant restraining face 16d side toward the base 16c side. When breaking of the second stitchings S2 and S2 reaches the vicinity of end parts of the third stitchings S3 and S3 on the occupant restraining face 16d side, the third stitchings S3 and S3 start to break from the end parts on the occupant restraining face 16d side, and as shown in FIG. 5, the entirety of the airbag 16 from the occupant restraining face 16d to the base 16c is finally deployed. When the first to third stitchings S1 to S3 are completely broken, the vent holes 16e and 16e are opened and surplus gas is discharged outside the airbag 16.

If each part of the airbag 16 were to be randomly deployed, since the shape of the airbag 16 during the process of deployment would become unstable, smooth deployment of the airbag 16 might be prevented, but in accordance with the present embodiment, since the first to third stitchings S1 to S3 fixing part of the airbag 16 in a folded state break in sequence from the occupant restraining face 16d side toward the base 16c, that is, from an already deployed part side toward a not yet deployed part side, it is possible to stabilize the shape of the airbag 16 during the process of deployment, thus carrying out smooth deployment. Furthermore, it is possible to ensure occupant restraining performance by firstly deploying the occupant restraining face 16d for restraining an occupant. Moreover, since the vent holes 16e and 16e are opened in the final stage of deployment of the airbag 16, it is possible to gently restrain the occupant by releasing through the vent holes 16e and 16e the internal pressure of the airbag 16, which is increased by the restraining of the occupant, while enabling rapid deployment of the airbag 16.

Second Embodiment

FIG. 6 to FIG. 9 show a second embodiment of the present invention.

Figure 6:
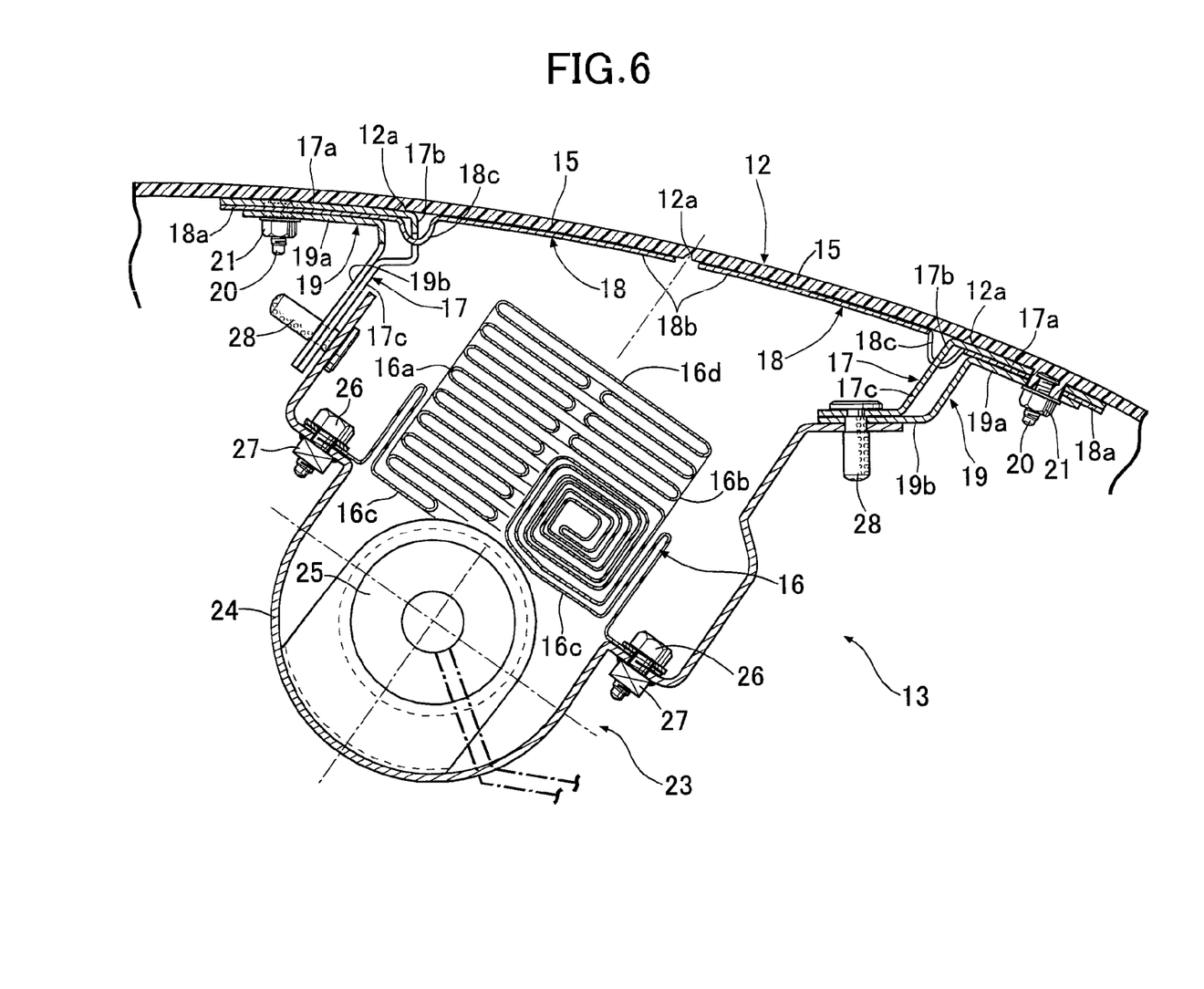
FIG. 6 is a view, corresponding to FIG. 2, related to a second embodiment (second embodiment).

In the first embodiment, part of the airbag 16 is folded in a bellows shape, but as shown in FIG. 6 in the second embodiment part of an airbag 16 is folded in a roll shape.

Figure 7:
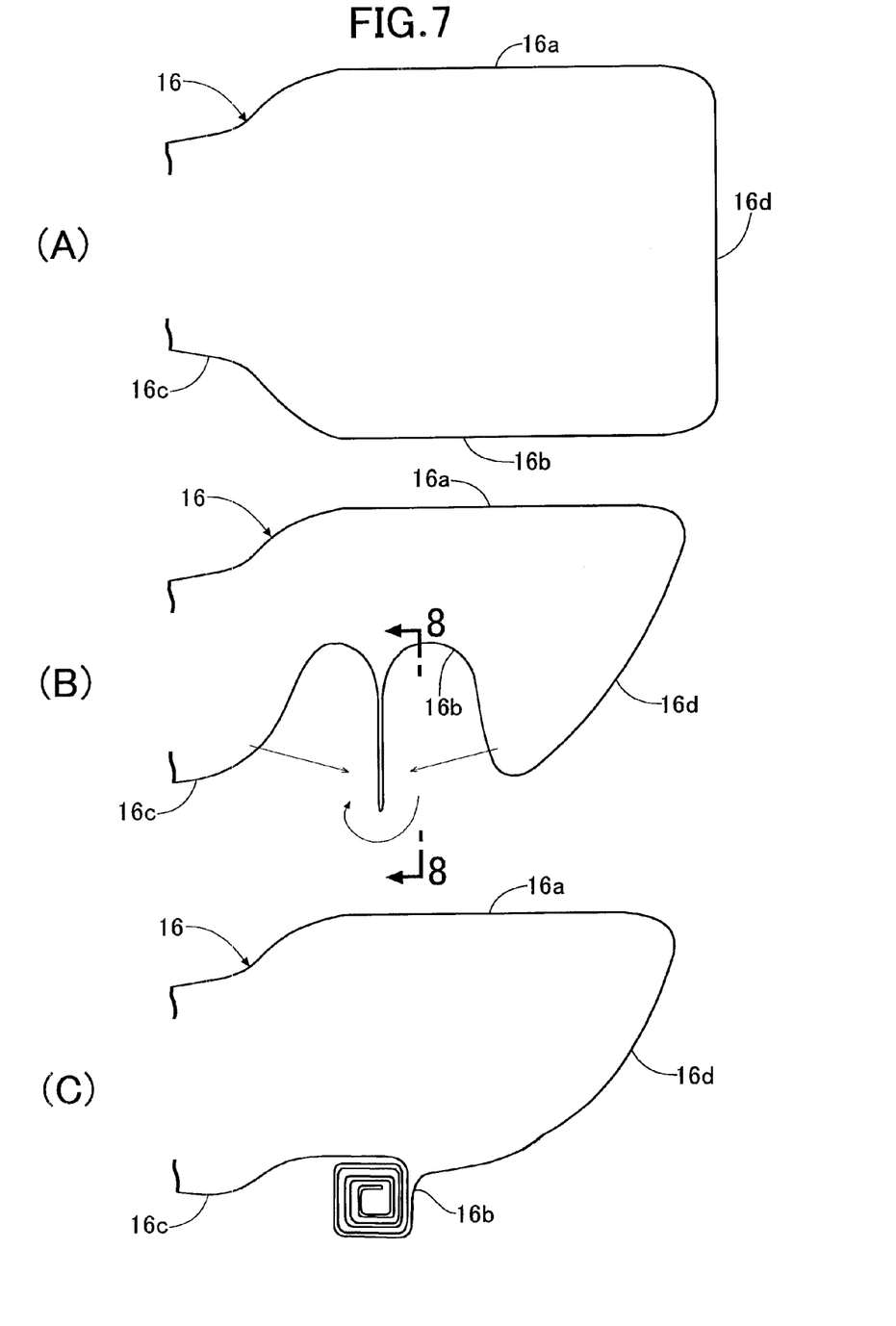
FIG. 7 is a diagram for explaining the process of folding an airbag (second embodiment).
Figure 8:
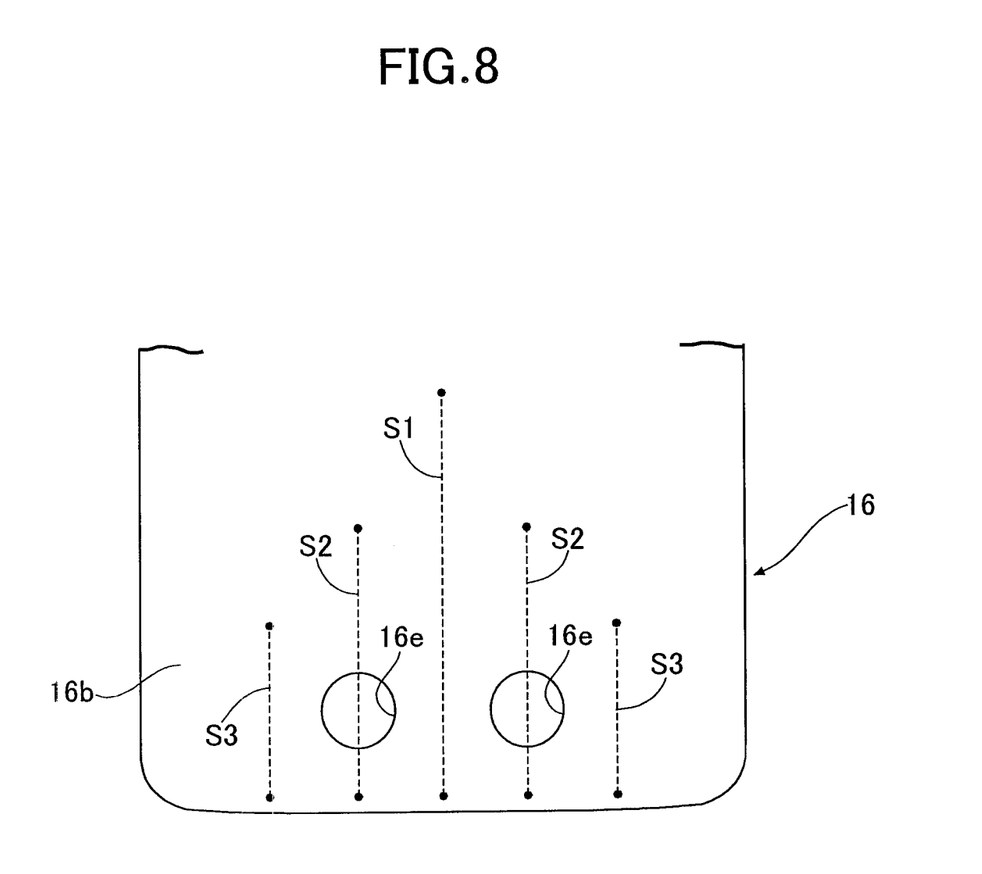
FIG. 8 is a view from arrowed line 8-8 in FIG. 7 (second embodiment).

As is clear from FIG. 7 and FIG. 8, a portion of a lower wall face 16b of the airbag 16 close to a base 16c on an inflator 25 side is folded in two and superimposed, and the folded and superimposed portion is stitched by stitchings S1 to S3 along a plurality of lines extending toward the base 16c and an occupant restraining face 16d (see FIG. 8). The first stitching S1, which is in the middle in the vehicle width direction, extends the longest toward the base 16c and the occupant restraining face 16d of the airbag 16, the second stitchings S2 and S2, which are on opposite left and right sides of the first stitching S1, are shorter than the first stitching S1, and the third stitchings S3 and S3, which are on opposite left and right sides of the second stitchings S2 and S2, are shorter than the second stitchings S2 and S2.

That is, with regard to extremities of the first to third stitchings S1 to S3 on the base 16c and occupant restraining face 16d side, the extremity of the first stitching S1 is the closest to the base 16c and the occupant restraining face 16d, and the extremities of the third stitchings S3 and S3 are the furthest from the base 16c and the occupant restraining face 16d. Therefore, the total breaking strength of the first to third stitchings S1 to S3 is the lowest on the base 16c and the occupant restraining face 16d.

Vent holes 16e and 16e are formed in the lower wall face 16b of the airbag 16, and the vent holes 16e and 16e are closed by the first to third stitchings S1 to S3 when the airbag 16 is nondeployed (see FIG. 8).

A portion of the airbag 16 other than the roll-shaped folded portion is folded in a bellows shape and housed in the interior of a retainer 24 as shown in FIG. 6.

Figure 9:
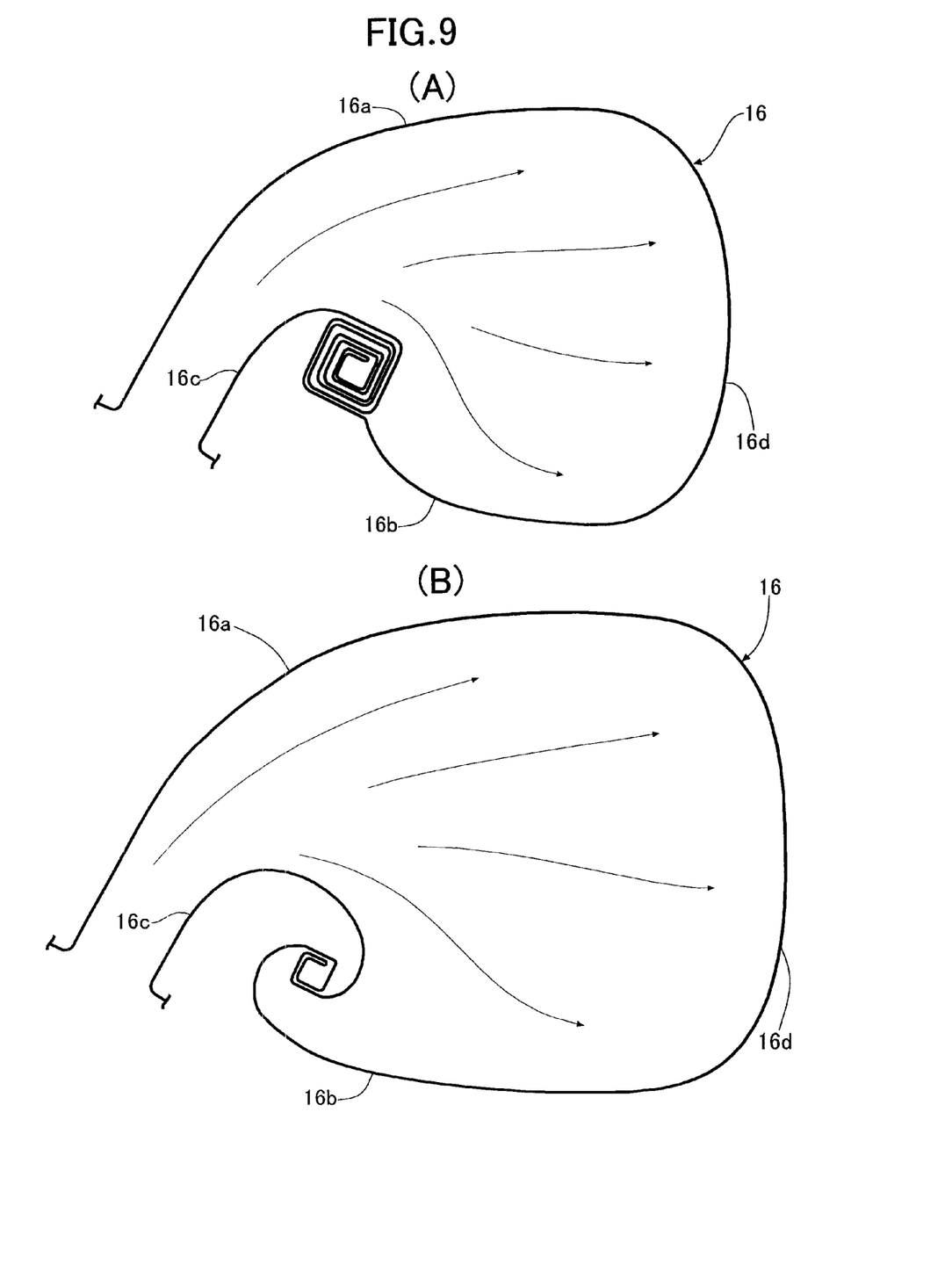
FIG. 9 is a diagram for explaining the process of deployment of the airbag (second embodiment).

When the vehicle is involved in a collision and gas generated by the inflator 25 is supplied to the airbag 16, as shown in FIG. 9 (A), the portion of the airbag 16 that is folded in a bellows shape is first released and deployed into the compartment. When the internal pressure of the airbag 16 increases, the first stitching S1, the second stitchings S2 and S2, and the third stitchings S3 and S3 in the portion that is folded in a roll shape break in sequence from the occupant restraining face 16d side and the base 16c side of the airbag 16, and as shown in FIG. 9 (B) the airbag 16 is deployed in sequence from the already deployed portion side toward the not yet deployed portion side. Opening the vent holes 16e and 16e (see FIG. 8) in the final stage of deployment of the airbag 16 enables the internal pressure of the airbag 16, which is increased by the restraining of the occupant, to be released through the vent holes 16e and 16e while enabling rapid deployment of the airbag 16.

In accordance with the second embodiment, the same operational effects as those of the first embodiment can also be achieved.

Modes for carrying out the present invention are explained above, but the present invention may be modified in a variety of ways as long as the modifications do not depart from the spirit and scope thereof.

For example, in the embodiments an airbag device for a passenger seat is explained, but the present invention may be applied to an airbag device for any application other than a passenger seat.

Furthermore, in the embodiments the lower wall face 16b of the airbag 16 is stitched by stitchings S1 to S3, but it may be the upper wall face 16a or left and right side wall faces that are stitched.

Moreover, the number of stitchings S1 to S3 is not limited to five as in the embodiments, and the shape of the stitchings S1 to S3 is not necessarily a straight line shape.

Furthermore, the joining part of the present invention is not necessarily the stitchings S1 to S3, and the joining part may be formed by adhesion of a base fabric or weaving of a base fabric.

The invention claimed is:

1. An airbag device in which an airbag housed in a folded state is deployed by gas generated by an inflator, wherein part of a base fabric of the airbag excluding an occupant restraining face is joined by first and second joining parts that extend in a deployment direction of the airbag, wherein the first joining part has a first length and the second joining part has a second length, said first length being greater than said second length such that the first joining part extends with said second joining part over the second length and extends beyond the second joining part in the deployment direction from an end of the second joining part, and wherein a total breaking strength of the first and second joining parts is greater at a location in which the first joining part extends with the second joining part than at a location in which the first joining part extends beyond the second joining part such that, as the airbag is deployed, the total breaking strength of the joining parts increases in going from an already deployed portion of the airbag toward a not yet deployed portion.

2. The airbag device according to claim 1, wherein a portion joined by the joining parts of the airbag is folded in a bellows shape so as to be able to extend in the deployment direction.

3. The airbag device according to claim 2, wherein the airbag comprises a vent hole closed by the joining parts.

4. The airbag device according to claim 1, wherein a portion joined by the joining parts of the airbag is folded in a roll shape so as to be able to extend in the deployment direction.

5. The airbag device according to claim 4, wherein the airbag comprises a vent hole closed by the joining parts.

6. The airbag device according to claim 1, wherein the airbag comprises a vent hole closed by the joining parts.

7. The airbag device according to claim 1, wherein a pair of second joining parts are provided, and the first joining part is disposed relatively between the pair of second joining parts.

8. The airbag device according to claim 7, wherein a portion joined by the joining parts of the airbag is folded in a roll shape so as to be able to extend in the deployment direction.

9. The airbag device according to claim 7, wherein the airbag comprises a vent hole closed by the joining parts.

10. The airbag device according to claim 7, wherein a portion joined by the joining parts of the airbag is folded in a bellows shape so as to be able to extend in the deployment direction.

11. The airbag device according to claim 1, further comprising a third joining part, said third joining part having a third length, and wherein said third length is less than said second length and such that the first and second joining parts extend with said third joining part over the third length and extend beyond the third joining part in the deployment direction from an end of the third joining part, and wherein the total breaking strength of the first, second, and third joining parts is greater at a location in which the first and second joining parts extend with the third joining part than at a location in which the first and second joining parts extend beyond the third joining part.

12. The airbag device according to claim 11, wherein as said second joining part, a pair of second joining parts are provided, and the first joining part is disposed relatively between the pair of second joining parts.

13. The airbag device according to claim 12, wherein as said third joining part, a pair of third joining parts are provided, and the first and second joining parts are disposed between the pair of third joining parts.

14. The airbag device according to claim 13, wherein a portion joined by the joining parts of the airbag is folded in a roll shape so as to be able to extend in the deployment direction.

15. The airbag device according to claim 13, wherein the airbag comprises a vent hole closed by the joining parts.

16. The airbag device according to claim 12, wherein a portion joined by the joining parts of the airbag is folded in a bellows shape so as to be able to extend in the deployment direction.

* * * * *